Oct. 11, 1966

W. G. ESSERS ETAL 3,277,527

METHOD AND APPARATUS FOR MANUFACTURING WIRE FROM POWDER MATERIAL

Filed April 26, 1965

INVENTORS
WILHELMUS G. ESSERS
WILLEM LUITEN
GERRIT W. TICHELAAR
PAUL CH. V.D. WILLIGEN
BY

AGENT

Oct. 11, 1966  W. G. ESSERS ETAL  3,277,527
METHOD AND APPARATUS FOR MANUFACTURING
WIRE FROM POWDER MATERIAL
Filed April 26, 1965  3 Sheets-Sheet 2

INVENTORS
WILHELMUS G. ESSERS
WILLEM LUITEN
GERRIT W. TICHELAAR
PAUL CH. V.D. WILLIGEN
BY
AGENT

United States Patent Office 3,277,527
Patented Oct. 11, 1966

3,277,527
METHOD AND APPARATUS FOR MANUFACTURING WIRE FROM POWDER MATERIAL
Wilhelmus Gerardus Essers, Willem Luiten, Gerrit Willem Tichelaar, and Paul Christiaan van der Willigen, all of Emmasingel, Eindhoven, Netherlands, assignors to North American Philips Company, Inc., New York N.Y., a corporation of Delaware
Filed Apr. 26, 1965, Ser. No. 450,874
Claims priority, application Netherlands, May 23, 1964,
6,405,793
6 Claims. (Cl. 18—9)

The invention relates to a method of manufacturing a wire, particularly a metal wire suitable for use in electric arc welding, from metal powder or a mixture of metal powder and alloying constituents and, as the case may be, other substances, for example slag-building substances, organic substances and the like. The invention furthermore relates to apparatus for carrying out said method and to the wire obtained by said method.

For welding in a protective gas atmosphere, particularly for welding in an atmosphere of carbon dioxide, large scale use is made of steel wire in which manganese and silicon and, if desired, other deoxidants are alloyed. The wires are obtained by rolling out ingots and subsequently drawing a wire.

So-called filled wires hollow flux cored wires are also made for this purpose. Such wires are made from folded, tape-shaped metal strips, the envelope thus formed being filled with metal powders and, if desired, slag-building substances. These wires have the disadvantage of being expensive and due to the presence of longitudinal split, the filling is difficult to keep constant.

As far back as 1902 it was proposed to manufacture wires (from metals that can be melted only with difficulty) directly from powders by rolling.

It has furthermore been proposed to manufacture electrodes for use in arc welding from non-sintered iron powder, which is formed into a bar by rolling.

However, the manufacture of such bars has not been put into practice.

Rolling iron powder to obtain sheets or plates is also known. It is furthermore known to cut sheets obtained by rolling powders into strips, which are worked up to wires by sintering, rolling or drawing. However, cutting rolled sheets is a time-consuming and costly operation.

It is furthermore known to mix metal powder with a binder, to compress this mixture in an extrusion press to form a bar, which is heated and rolled out.

The invention has for its object to provide a method and apparatus which permits rolling metal powders or a mixture of metal powder and alloy constituents and/or slag-building substances in the cold state to form wires or rods which exhibit a reasonable coherence. Such wire is subsequently processed by heating for example at 1300° C. in an non-oxidizing atmosphere and by rolling and, if necessary, by drawing until wires are obtained which are suitable for use inter alia in electric arc welding.

A great advantage of the novel method and device consists in that wires of highly different compositions can be manufactured in an extremely simple manner. The use of ingots as starting material and of long rolling mills is no longer required. The starting material may be a very homogeneously mixed powder.

The invention is based on the recognition of the fact that great attention must be given to the gap formed by the rollers between the roller grooves. With conventional profile rollers, shown in FIG. 1 in a plan view, the powder is compressed very strongly in the said gaps $a$, so that the rollers are slightly urged away from each other. The result is that the wires I and II formed by the profiled grooves $p$ and $q$ in the rollers A and B are interconnected by very strong bridges formed in the gaps. After the wires I and II are rolled, these bridges must be removed. According to the invention practically no bridges (also termed cheeks) are formed between the rolled wires.

The invention will now be described in detail with reference to the accompanying drawing in which the invention is schematically illustrated for simplicity and clarity and in which.

Figure 1:
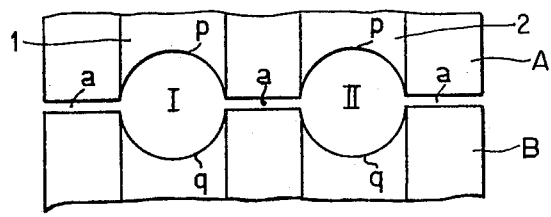
FIG. 1 is a partial schematic plan view looking into the bite of a pair of known rollers for forming wire as noted hereinabove.
Figure 2:
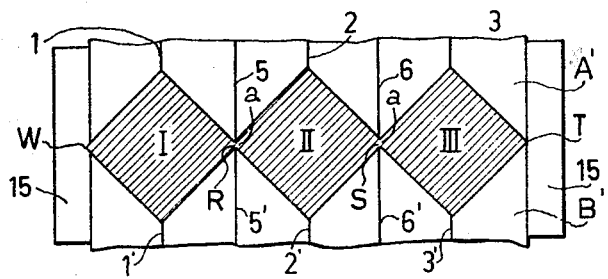
FIG. 2 is a schematic illustration similar to FIG. 1 showing a preferred form of rollers according to this invention.
Figure 3:
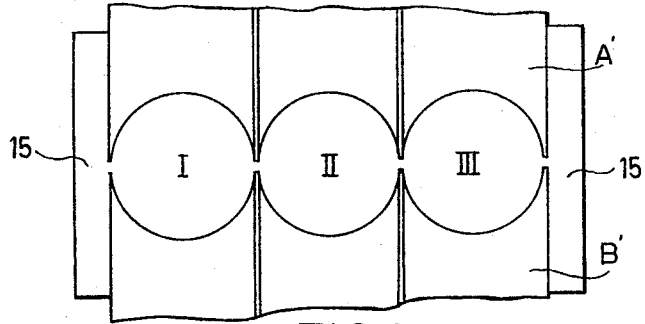
FIGS. 3 and 4 are similar to FIG. 2 showing other forms of roller grooves according to the invention.
Figure 4:
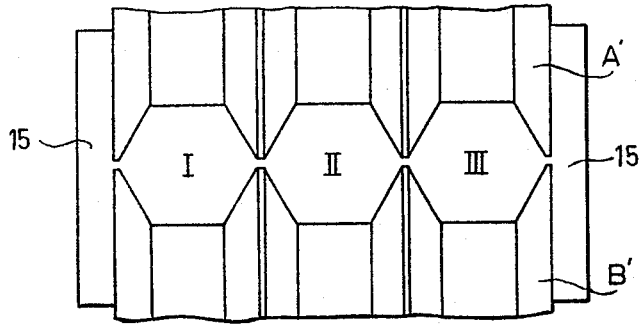

In a first form of the invention the dimension of said gaps measured in the direction of width of the rollers (in the figures from left to right) is minimized. The result is at least two rollers rotatable in opposite directions (clockwise and counterclockwise), the circumferential surfaces of which are provided with at least two complementary V-shaped grooves disposed side by side in the direction of width of the rollers and each forming a half wire profile. Between the grooves of each roller there are very narrow or sharp ridges. The circumferential grooves 1, 2 and 3 and 1', 2', 3' of the rollers A' and B' respectively, together form square profiles I, II and III, which join each other by punctiform edges 5 and 6, and 5', 6' respectively of the rollers, so that at R, S, T and W practically no intermediate bridges are formed. The punctiform edges 5 and 6 are rounded off in practice with, for example, a radius of curvature of 0.3 mm. These edges operate as wedges which push the powder laterally into the roller grooves. FIGS. 3 and 4 show partial schematic plan views of fluted rollers, the grooves forming circular profiles I, II and III and polygonal profiles respectively. Plates 15 are provided as the lateral outside boundary of the wede-shaped space between the rollers.

It should be noted that instead of using a set of such rollers, a plurality of such sets of rollers may be arranged one after the other (in series). In a system ready for operation these simple sets of rollers are followed by a heating or sintering furnace, the products of which may be fed to a further rolling and drawing device.

It has been found that the rollers must have a fairly large diameter as compared with the diameter of the wire to be made. The ratio between said diameters may for example be 50:1 to 100:1. Satisfactory experiments have been made with rollers having a diameter of 420 mms. The maximum wire diameter was 4 mms.

A wire with a square, polygonal or other profile obtained by means of such a set of rollers may, if desired, be deformed into a wire of circular profile.

In a further embodiment of the invention the powder introduced into the wedge-shaped space is guided away from said gaps.

This results in a device comprising two rollers rotatable in opposite directions, the surfaces of which are provided with one or more complementary grooves forming the wire profile. On each side of each groove there is arranged a wedge-shaped guide member, the edge of which extends as far as possible into the wedge-shaped space between the rollers.

Figure 5:
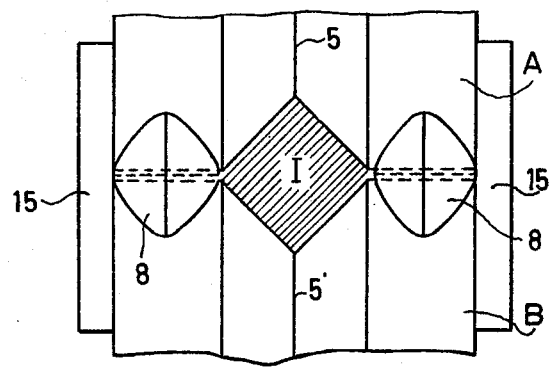
FIGS. 5 and 6 are schematic views of a modification of the invention again looking into the bite of the rollers.
Figure 6:
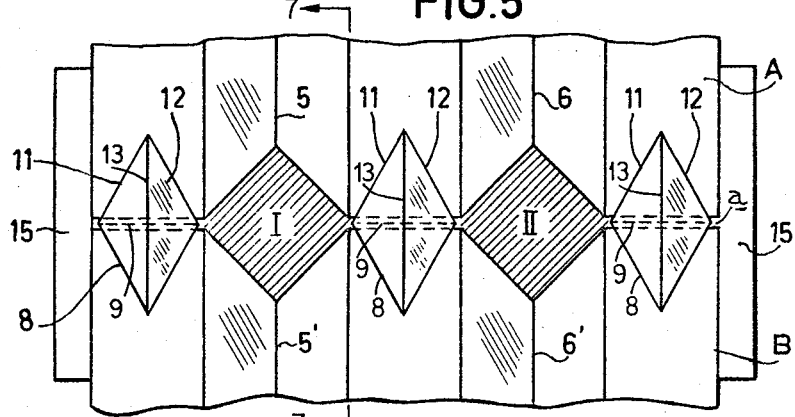
Figures 7, 8:
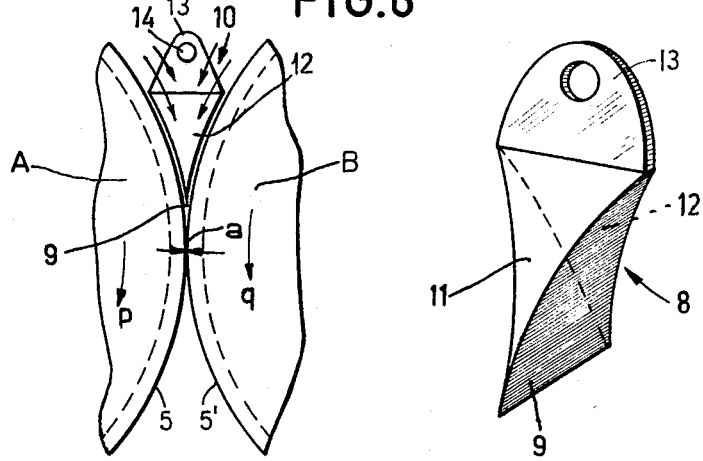
FIG. 7 is a side elevation of the rollers of FIG. 5 or 6.
FIG. 8 is a perspective view of a wedge according to FIGS. 5, 6 and 7.

FIGS. 5 and 6 show partial plan views of rollers with such guide members. FIG. 7 shows diagrammatically a side elevation of a set of rollers A and B, rotatable in opposite directions $p$ and $q$ and FIG. 8 illustrates a possible construction of a guide member.

From FIG. 7 it will be apparent that between the rollers A and B there is formed a wedge-shaped space 10, to which powder is fed.

FIG. 5 shows a set of rollers A and B, each which have one circumferential groove 5, 5', which form a wire profile I. FIG. 6 shows a set of rollers A and B, each having two circumferential grooves 5 and 6 and 5', 6' respectively, which form profiles I and II.

The gaps $a$ on both sides of the profiles in this embodiment are covered by guide members 8, which are shaped in the form of wedges having edges 9 which extend as far as possible into the wedge-shaped space 10, i.e. as closely as possible to the gap $a$.

The wedges 8 are provided with bevelled faces 11 and 12, which guide the powder introduced into the wedge-shaped space 10 towards the profile openings I and II respectively via the gaps $a$.

The row of guide members 8 may be interconnected by a bar 14 (FIG. 7).

It will be seen from FIG. 5 that the rollers may be bounded laterally by plates 15.

Figure 9:
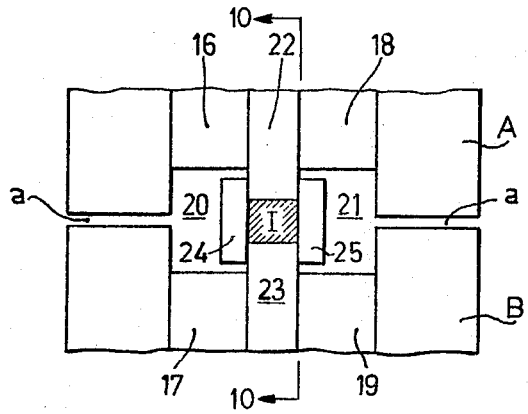
FIGS. 9 and 10 are views similar to FIGS. 5 and 7 of another embodiment of the invention.

FIG. 9 shows a further embodiment of the device according to the invention in which the powder is kept clear of the gaps $a$. At the side of said gaps chambers 20 and 21 are formed by grooves 16 and 17 and 18, 19 respectively cut into the circumferential faces of the rollers A and B. Said chambers 20, 21 accommodate members 24 and 25 respectively which extend therein at right angles to the plane of the drawing and which, together with raised collars 22 and 23 provide the rolled profile I for the formation of a wire.

Figure 10:
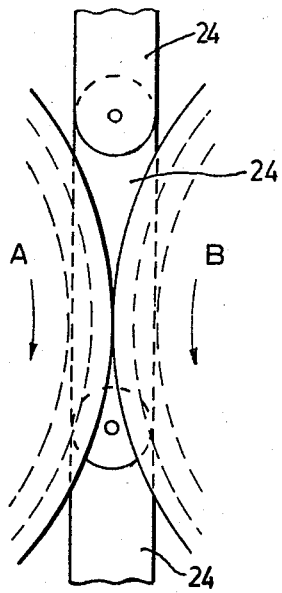

The members 24, as shown in FIG. 10, may be interconnected pivotally to form an endless chain which is capable of moving with the rollers so that during the rolling operation minimum friction is involved. Likewise member 25 may be similarly arranged.

Very satisfying products have been obtained from an iron powder reduced from $Fe_3O_4$ by carbon, which may be subsequently reduced by hydrogen and which has powder particles having a porous or spongy surface.

What is claimed is:

1. Apparatus for manufacturing wire from a metal powder material comprising a pair of rollers rotatable in opposite directions about parallel axes for forming a bite therebetween, each said roller having at least one complementary groove for forming a wire profile therebetween, and means adjacent the side of each of said grooves for feeding powder material into said grooves in a lateral direction substantially at the bite of said rollers.

2. Apparatus according to claim 1 wherein said means comprises a member having a sharply pointed edge extending in the axial direction of said rollers substantially at the bite of said rollers.

3. Apparatus according to claim 1 wherein said means comprises a wedge-shaped member having its pointed edge extending substantially into the bite of said rollers and having a bevelled face adjacent the lateral edges of said grooves.

4. Apparatus according to claim 1 wherein said means comprises an undercut groove adjacent each side of said wire forming groove for forming a peripheral chamber between said wire forming groove and the radial surfaces of said rollers, and plate-shaped means in said chambers adjacent the edge of said wire forming groove.

5. Apparatus according to claim 4 wherein said plate-shaped means comprises an endless belt of plate-shaped members movable with said rollers.

6. Apparatus according to claim 1 wherein the ratio of the diameter of said rollers to the depth of said wire forming grooves is on the order of 50:1 to 100:1.

References Cited by the Examiner

UNITED STATES PATENTS

| | | | |
|---|---|---|---|
| 309,118 | 12/1884 | Willcox | 18—21 X |
| 1,178,875 | 4/1916 | Rios | 18—9 X |
| 2,874,417 | 2/1959 | Ramse | 18—9 X |
| 2,919,466 | 1/1960 | Roemer | 18—9 |
| 2,932,852 | 4/1960 | Melville et al. | 18—9 |
| 2,998,623 | 9/1961 | Lawson et al. | 18—9 |
| 3,010,148 | 11/1961 | Dasher | 18—9 |
| 3,075,243 | 1/1963 | Shipley et al. | 18—9 |
| 3,083,407 | 4/1963 | Lieb et al. | 18—9 X |
| 3,123,656 | 3/1964 | Rochlin | 18—9 X |
| 3,140,511 | 7/1964 | Seufert et al. | 18—9 X |
| 3,144,681 | 8/1964 | Krantz et al. | 18—9 |

FOREIGN PATENTS 262,996  11/1949  Switzerland.

WILLIAM J. STEPHENSON, *Primary Examiner.*